Patented May 3, 1927.

UNITED STATES PATENT OFFICE.

JACQUE C. MORRELL AND GUSTAV EGLOFF, OF CHICAGO, ILLINOIS, ASSIGNORS TO UNIVERSAL OIL PRODUCTS COMPANY, OF CHICAGO, ILLINOIS, A CORPORATION OF SOUTH DAKOTA.

PROCESS OF OBTAINING RESINLIKE BODIES FROM CRACKED HYDROCARBON PRODUCTS.

No Drawing.     Application filed April 27, 1923. Serial No. 635,122.

This invention relates to improvements in a process for recovering resinous bodies recovered from oils and refers more particularly to the utilization of resinous bodies and coloring material derived from cracked distillates such as those produced in the pressure distillation or destructive distillation of petroleum oil. The invention further has to do with the conversion of such resinous bodies into useful materials and marketable commercial products.

Such resinous bodies and coloring material may be removed from the oils by suitable adsorbing agents such as fuller's earth, bentonite, various clays, charcoal and numerous other materials from which the resinous bodies may be separated by any of the known methods. It has been found that when such bodies are subjected to the action of oxidizing agents such as air, oxygen, ozone, or other oxidizing agents at a slightly elevated temperature or are treated with polymerizing agents such as the salts of heavy metals, for example, ferric chloride, zinc chloride, stannic chloride and others, that hard resin-like bodies are obtained which have many industrial applications. The resinous bodies may be subjected to both the action of an oxidizing agent and a polymerizing agent.

For example, by dissolving in suitable solvents such as turpentine, linseed oil and innumerable other vegetable, gum or mineral products, these bodies may be used for varnish, paint, insulating films and filaments, fillers and other useful purposes. These coloring matters removed from cracked distillate are of a more or less unsaturated nature and readily resinify on the passage of such oxidizing agents through them and may be readily polymerized when treated with the above mentioned metal salts.

Thus it is practical and a decided advantage to recover this coloring material and resinous body and treat in this manner in order to produce valuable products which may be utilized and sold for commercial purposes.

While in this connection the removal of these products has been particularly described as by-products recovered from cracked distillates, other distillation products may be as successfully treated for their resinous products. Cracked distillates are, however, at the present time relatively abundant and afford an extensive field for recovering this material.

We claim as our invention:

1. A process of obtaining hard resin-like bodies from cracked hydrocarbon distillates, consisting in removing said resinous bodies with an adsorbing agent and subjecting the removed bodies to a partial oxidizing action to produce a hard resin-like body.

2. A process of obtaining hard resin-like bodies from cracked hydrocarbon distillates, comprising treating the hydrocarbon distillate with an adsorbing agent to remove the resinous materials therefrom, and subjecting the resinous material to a partial oxidizing action at a slightly elevated temperature above atmospheric to produce a hard resin-like body.

3. A process of obtaining hard resin-like bodies from cracked hydrocarbon distillates, consisting in removing said resinous bodies with an adsorbing agent and subjecting the removed bodies to a partial oxidizing and polymerizing action to produce a hard resin-like body.

4. A process of obtaining hard resin-like bodies from cracked hydrocarbon distillates, comprising treating the hydrocarbon distillate with an adsorbing agent to remove the resinous materials therefrom, and subjecting the resinous material to a partial oxidizing and polymerizing action at a slightly elevated temperature above atmospheric to produce a hard resin-like body.

5. A process of obtaining hard resin-like bodies from cracked hydrocarbon distillates, consisting in removing said resinous bodies with an adsorbing agent and subjecting the removed bodies to a partial polymerizing action to produce a hard resin-like body.

JACQUE C. MORRELL.
GUSTAV EGLOFF.